United States Patent Office 2,860,677
Patented Nov. 18, 1958

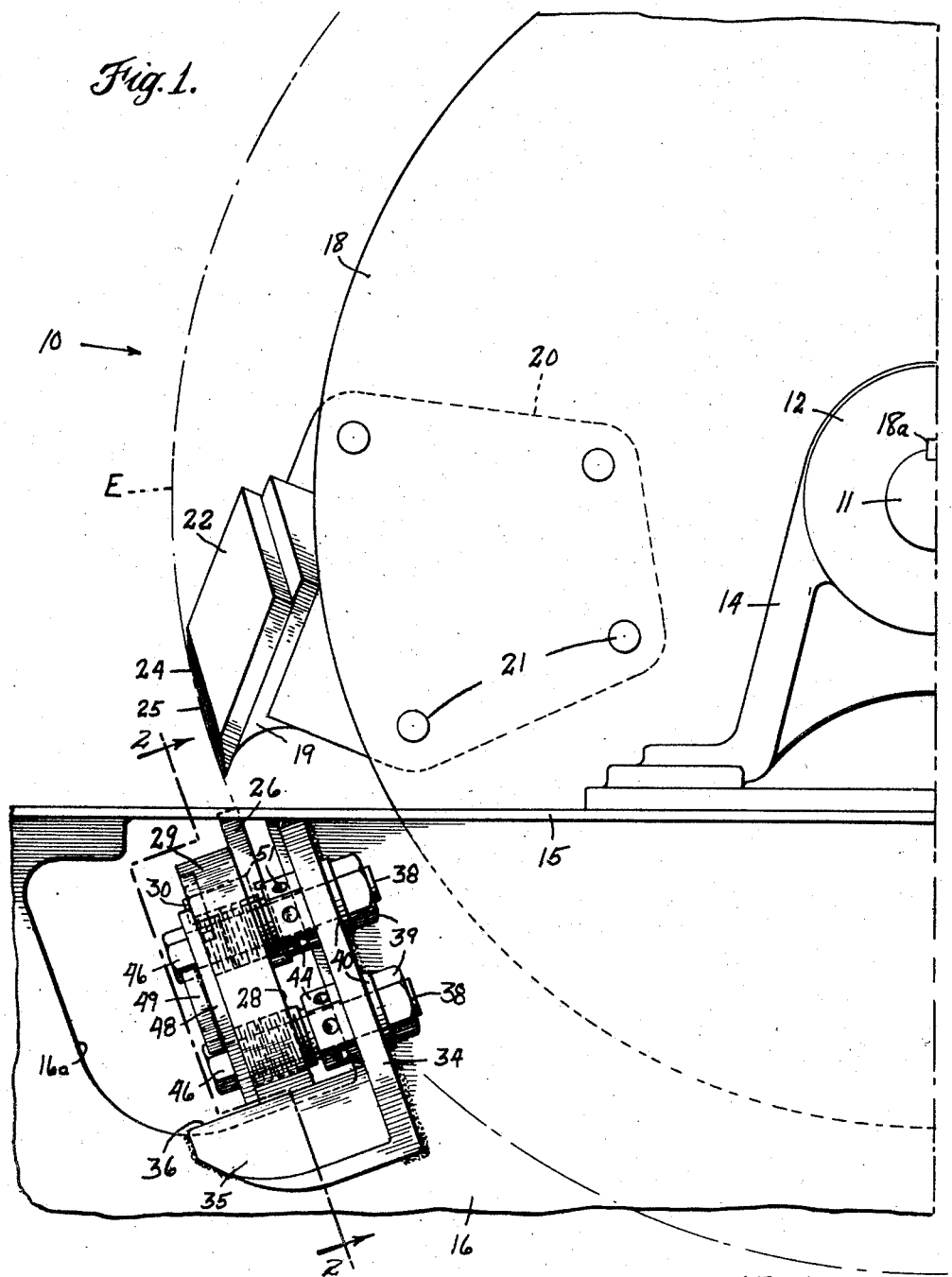

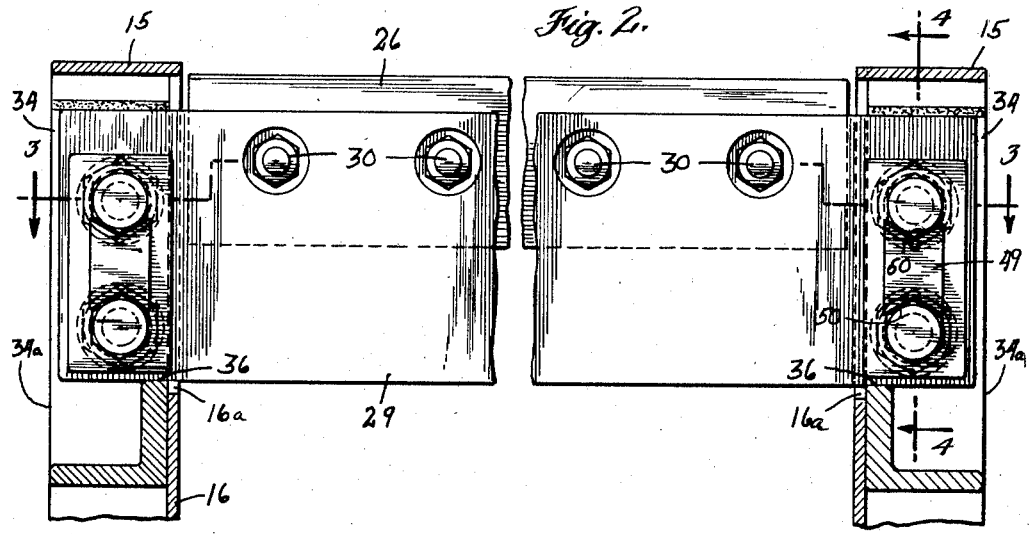
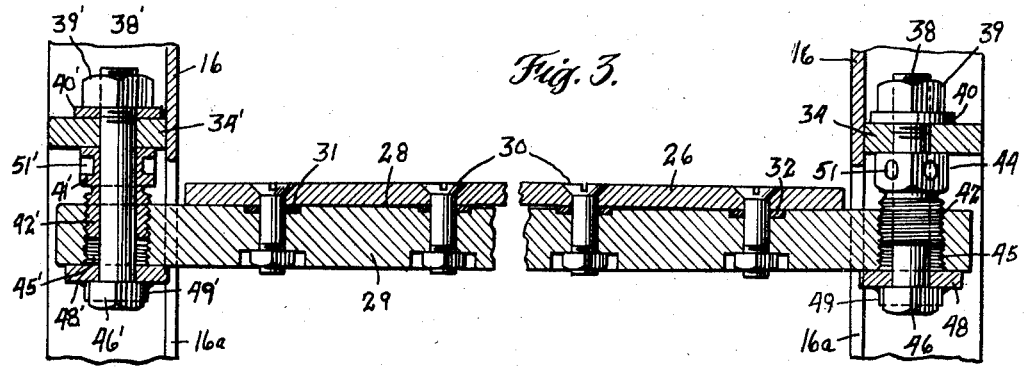
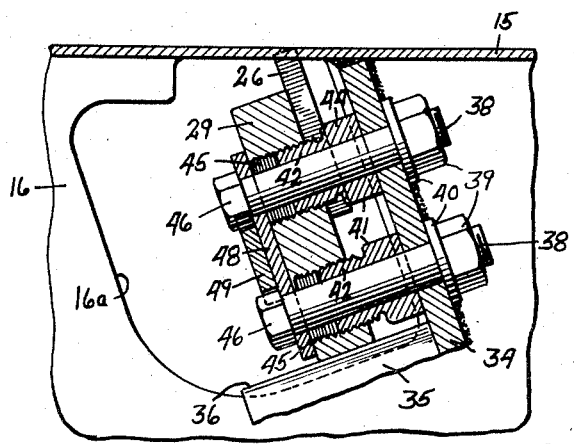

2,860,677

KNIFE SUPPORTING MEANS

James R. West and Edward C. Procter, New Holland, Pa., assignors to Sperry Rand Corporation, New Holland, Pa., a corporation of Delaware Application July 20, 1956, Serial No. 599,126

6 Claims. (Cl. 146—117)

This invention relates generally to reel type cutting or chopping mechanisms. More particularly, the invention relates to a device for adjusting and holding a stationary knife or shear bar in a cutting mechanism such as that shown and described in U. S. Patent No. 2,735,469 issued February 21, 1956.

In the mechanism shown in Patent 2,735,469, the cutter reel knives describe a hyperboloid of progressively smaller diameter due to removal of metal through wear and in sharpening. It is necessary that the stationary knife or shear bar be periodically repositioned or adjusted toward the cutter reel to maintain the cutting edge of the shear bar properly disposed relative to the cutting edge generated by the reel.

One object of this invention is to provide a device for supporting and adjusting a shear bar whereby the shear bar may be infinitely adjusted and, when adjusted to desired position, locked firmly in place.

Another object of this invention is to provide a device of the character described having holding means which is relegated to a holding task, being subjected to none of the shearing forces on the shear bar.

Another object of this invention is to provide a device of the character described for supporting and adjusting a shear bar which is rectangular in cross-section and which is mounted at a tangent relative to the cutting edge generated by a cutter reel, said device being such that during adjustment or repositioning of the shear bar the tangential extension of the shear bar relative to the reel is not disturbed.

Another object of this invention is to provide a device of the character described having means whereby the amount of adjustment of the shear bar may be closely regulated.

A further object of this invention is to provide adjustment means in a device of the character described which is readily accessible.

A still further object of this invention is to provide a device of the character described which has relatively few parts and can be manufactured at low cost.

Other objects of this invention will be apparent hereinafter from the specification and from the recital in the appended claims.

In the drawings:

Fig. 1 is a fragmentary, partially generally diagrammatic, side elevation of a cutter reel and its cooperative shear bar, the shear bar being mounted by a device constructed according to one embodiment of this invention;

Fig. 2 is a fragmentary section taken on the lines 2—2 of Fig. 1 and looking in the direction of the arrows;

Fig. 3 is a fragmentary section taken on the lines 3—3 of Fig. 2 and looking in the direction of the arrows; and Fig. 4 is a section taken on the line 4—4 of Fig. 2 and looking in the direction of the arrows.

Referring now to the drawings by numerals of reference, 10 denotes generally a cutter reel of the type shown in U. S. Patent No. 2,735,469. Only one side of the reel is illustrated, it being understood that the opposite side of the reel is similarly constructed.

Reel 10 is mounted on a shaft 11 driven from a source of power, not shown. Shaft 11 is journaled for rotation in spaced bearings 12 supported on pedestals 14 mounted on out-turned flange portions 15 of frame 16. The cutter reel includes a pair of relatively spaced, parallel discs 18 having hubs keyed as at 18a to shaft 11. Extending between discs 18 are a plurality of knife supports 19 having end plates 20 bolted, riveted, or otherwise secured at 21 to the discs. Each support 19 carries a knife 22 beveled at 24 to provide a cutting edge 25.

As described fully in the above mentioned patent, knives 22 are mounted so that they extend at an angle to the rotational axis of the reel; and, the cutting edges 25 of the knives 22 generate a hyperbolic cutting edge E. To obtain a good cutting action the stationary knife or shear bar of the mechanism, which is denoted 26, is mounted so that it is bowed toward reel 10 (Fig. 3) to closely approximate the hyperbolic curve generated. Knife 26 is normally flat and rectangular in cross-section; and, it is connected to the flat face 28 of a holder 29 by a plurality of bolts 30. The bores in holder 29 which receive bolts 30 are counterbored at 31 from side face 28. These counterbores get progressively deeper from the center of the support outwardly. Seated in each counterbore and projecting therefrom is a spacer-washer 32. All of the spacer-washers used are of the same, precise, uniform thickness. However, since the depth of the counterbores in which they seat vary, the spacer-washers project varying distances. The counterboring arrangement is such that when knife 26 is bolted down tightly to engage the spacer-washers, the knife is bowed outwardly to a desired degree relative to holder 29.

As the cutting edges 25 on the knives 22 on the cutter reel 10 wear down and when they are sharpened, the diameter of the cutting edge E at any given point on the generated hyperboloid (Fig. 1) is decreased. It is necessary, therefore, to periodically adjust the shear bar 26 toward reel 10 to compensate for this metal removal. For this purpose, the adjusting-holding means of this invention is provided and will now be described.

Each side wall of mechanism frame 16 is provided with an opening 16a through which one end of holder 29 projects. A pair of adjustment-supporting devices are provided, one for each end of holder 29. Since both devices are identical, only one will be described, similar parts in the other device being denoted with primed reference numerals.

Welded to the outside of each side wall of frame 16 is a support or bracket 34 which extends at an incline relative to the vertical axis of the cutter mechanism (Figs. 1 and 4). Support 34 has a transverse portion 35 which provides a guide or ledge 36 on which the bottom of holder 29 seats. Holder 29 is connected to bracket 34 by a pair of tension bolts 38, having associated nuts 39 and washers 40. Interposed between tension bolts 38 and holder 29 and between the holder and support 34 is a pair of thimbles 41, each of which comprises an externally threaded shank portion 42 and an enlarged hexagonal head 44. The thimbles are bored to receive the tension bolts; and, as shown in Fig. 4, the bolts are threaded at their outer ends only to provide a smooth shank extending through the thimbles. The threaded shanks 42 of the thimbles thread into tapped holes 45 in holder 29; and, one hexagonal flat of each head 44 extends generally parallel to the side edge 34a of bracket 34 (Fig. 2). The heads 44 of the thimbles normally abut against support 34.

Tension bolts 38 have heads 46 which seat against a flat washer-plate 48 interposed between these heads and holder 29. Welded to the outer face of plate 48 is a lock plate 49 having a V-shaped pocket 50 (Fig. 2) at each end engaging a bolt head 46 and preventing it from turning because of vibration or other reasons during the operation of the cutting mechanism.

As shown in Figs. 1 and 3, each hex flat of each head 44 of each thimble 41 is provided with a cylindrical hole 51. The holes 51 are provided for reception of a rod so that the thimbles may be readily manually rotated without obstructing one's view of the thimbles which would be the case if a wrench were used. Further, in some positions of the thimbles, a wrench might not be insertable between holder 29 and bracket 34.

Adjustment of stationary knife or shear bar 26 toward reel 10, or away from the reel, is achieved by first loosening nuts 39. This frees the thimbles 41 from the vice-like clamp between support 34 and washer-plate 48 and holder 29 and permits rotation of the thimbles. The operator of the machine inserts a rod in one of the holes 51 in one of the thimbles and gives the thimble a turn, such as a one-sixth turn. He then rotates the other thimble a similar amount. Turning the thimbles one-sixth increments is easily obtained since one flat of each thimble extends parallel to the side edge 34a of support 34. Each thimble merely has to be rotated an amount sufficient to bring the next flat into parallel relationship with the side edge of support 34. When the thimbles are rotated, holder 29 is moved toward or away from the head 44 of the thimbles, depending on the direction of rotation of the thimbles. After thimbles 41 have been adjusted, nuts 39 are again tightened up to clamp the thimbles in adjusted position. The disposition of the shear bar relative to the cutting edges 25 of the knives of the cutter head can be examined, and if satisfactory, the mechanism may be operated. If the amount of adjustment is not satisfactory, nuts 39 can be loosened and thimbles 41 adjusted further until a desired position of the shear bar relative to the cutter reel is obtained.

The movement of six flats past a specified point is required to rotate a thimble one revolution. Thus, the variations in adjustment of the thimbles are practically infinite and correspondingly the adjustment of holder 29 and shear bar 26 is likewise infinitely variable.

For optimum cutting action, it is desirable that the tangential relationship between shear bar 26 and the cutting circle E generated by the reel 10 be maintained when the shear bar is adjusted. Ledge 36 of bracket 34 insures against such disturbance. The ledge serves as a guide surface; and, knife 26 is properly adjusted only when the base of holder 29 seats solidly on the ledge. If the holder is cocked slightly, one thimble or the other has been adjusted too much.

A further feature of this invention is that all shear loads on bar 26 are supported by ledge 36 and not by the bolts 38. The tension bolts are relegated merely to holding the shear bar in adjusted position and no bending stresses are imparted to them.

The holes 51 in the thimbles makes it possible to turn them without having to use a wrench. This is important since at times the space between holder 29 and bracket 34 is limited. Further, when a rod is used, the operator's view of the thimbles is not materially blocked and he can readily align the flats of the thimbles with side edges 34a of the brackets 34. As for the nuts 39, they are adapted for the application of a wrench since they are readily accessible and are merely turned until they are loosened or tightened up.

While this invention has been described in connection with a particular embodiment thereof and in conjunction with a particular cutter mechanism, it will be understood that it is capable of further modification and other uses, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described our invention what we claim is:

1. A device for adjustably mounting a knife, comprising a holder, means connecting said knife to said holder, a support, releasable means connecting said holder to said support and locking the holder against movement relative to the support, a member threaded into a hole in said holder and having a head portion projecting out of said hole which spaces the holder from said support, said member being rotatable only on release of said connecting means to vary the projection of said portion out of said hole and thus the space between said holder and said support.

2. A device as recited in claim 1 wherein said support has a rectilinear side edge and said head has a plurality of flats around its periphery alignable, selectively, with said side edge on rotation of said member whereby the amount of rotation of the member may be positively controlled.

3. A device as recited in claim 2 wherein each flat on said head has a small hole for the reception of rod for rotating said member without obstructing the view thereof whereby said flats may be readily aligned with said support side edge.

4. A device as recited in claim 1 wherein said holder is rectangular in cross-section, there being provided a guide member perpendicular to said support on which said holder seats and over which the holder is slidable upon adjustment, said guide surface insuring proper angular disposition of said holder regardless of its spacing from said support and supporting the loads to which the holder may be subjected.

5. A device as recited in claim 1 wherein said releasable means comprises a bolt and nut, said bolt extending through said holder, said threaded member and said support, the portion of said bolt extending through said threaded member having a smooth periphery and there being a threaded portion of said bolt extending beyond support on which said nut is threadable.

6. A device for adjustably mounting a knife comprising a holder, means for fastening said knife to said holder, a member having a flat guide surface on which said holder seats, a support having a rectilinear side edge extending perpendicular to said guide surface, a pair of tension bolts connecting said holder to said support, a pair of tapped holes in said holder through which the respective bolts pass, an element threaded into each tapped hole and interposed between said holder and one of said bolts, each element having a head portion projecting outwardly of its associated hole and spacing said holder from said support, each head portion having a plurality of flats around its periphery alignable selectively with said rectilinear side edge of said support on rotation of the head portion, said elements being manually rotatable when said bolts are loose to vary the space between said holder and said support, said guide surface providing means for insuring proper angular disposition of said holder relative to said support regardless of its spacing from the support.

References Cited in the file of this patent

UNITED STATES PATENTS

| 661,081 | Sellstrom | Nov. 6, 1900 |

FOREIGN PATENTS

| 6,386 | Great Britain | 1910 |
| 452 | Australia | Feb. 4, 1927 |